Nov. 25, 1947.  I. PAGE  2,431,582
ELECTRIC PRESSURE POT AND AUTOMATIC COOKER
Filed Dec. 30, 1944   2 Sheets-Sheet 1
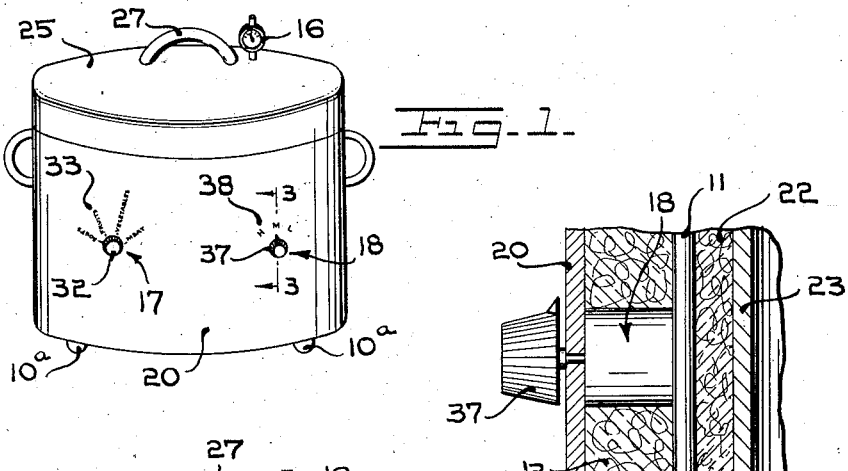
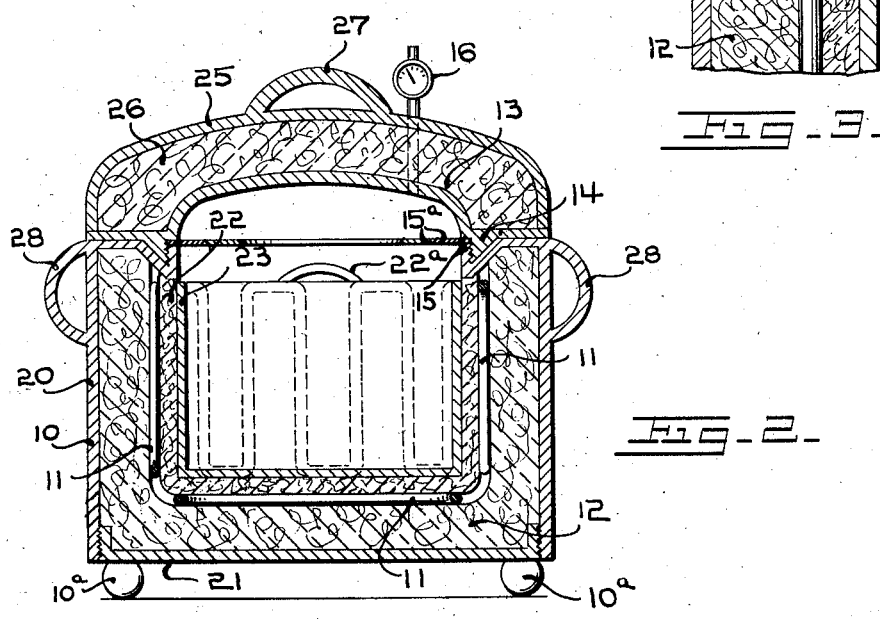
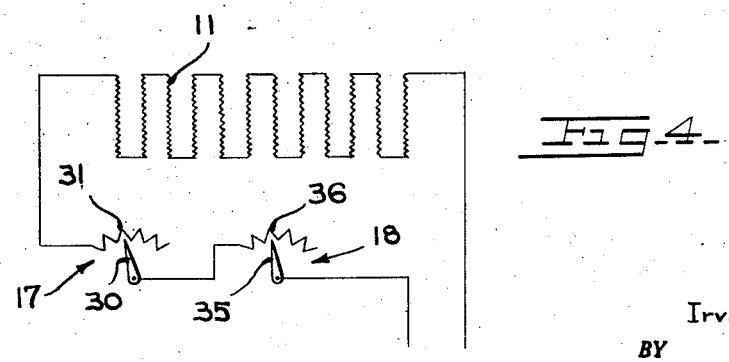
INVENTOR.
Irving Page Nov. 25, 1947.  I. PAGE  2,431,582
ELECTRIC PRESSURE POT AND AUTOMATIC COOKER
Filed Dec. 30, 1944  2 Sheets-Sheet 2

INVENTOR.
Irving Page
BY
ATTORNEY.

Patented Nov. 25, 1947

2,431,582

UNITED STATES PATENT OFFICE 2,431,582

ELECTRIC PRESSURE POT AND AUTOMATIC COOKER

Irving Page, New York, N. Y.

Application December 30, 1944, Serial No. 570,556

1 Claim. (Cl. 219—44)

This invention relates to new and useful improvements in electric pressure pots and automatic cooker.

More particularly the invention proposes an improved pot which is adapted to receive food, or dishes of food and which is capable of heating the food under pressure.

More particularly it is proposed to characterize the new and improved pressure pot by the fact that it includes a pot body having hollow walls, and heating coils mounted within said walls. It is proposed to arrange heat insulation material within the walls to keep the outside of the pot cool. The pot is provided with a cover adapted to be tightly mounted on it so as to maintain the pressure within the pot. It is proposed to provide a safety valve and pressure gauge of the pot.

The invention still further proposes the provision of a novel means for controlling the heating coils of the pot. It is proposed to so arrange the control that it may be set for heating soups, fruits, vegetables, meats, etc. An arrangement is also proposed whereby the heat may be high, medium or low.

Still further the invention proposes a modified form in which an additional control is provided for varying the heat within the pot in proportion with the amount of weight lost by the food being cooked, due to driving off moisture from the food.

Still further the invention proposes the construction of an improved electric pressure pot which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of an electric pressure pot constructed in accordance with this invention.

Fig. 2 is a vertical enlarged sectional view of the pot shown in Fig. 1.

Fig. 3 is a fragmentary enlarged sectional view taken on the line 3—3 of Fig. 1.

Fig. 4 is a schematic wiring diagram of the pressure pot.

Figures 5, 6:
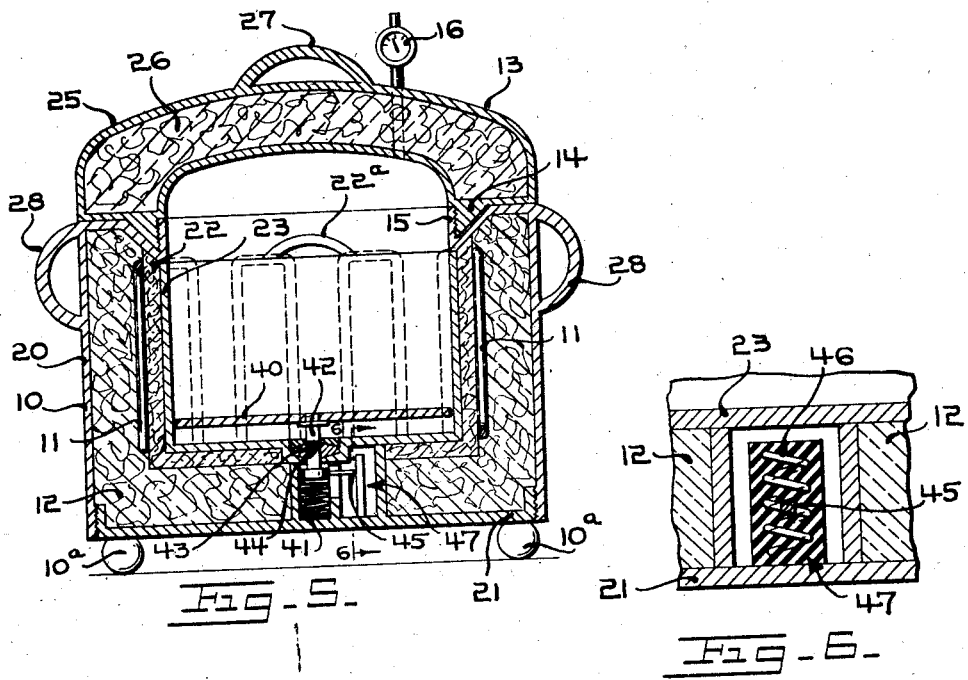
Fig. 5 is a sectional view similar to Fig. 2 but illustrating an electric pressure pot in accordance with a modified form of this invention.
Fig. 6 is a fragmentary enlarged vertical sectional view taken on the line 6—6 of Fig. 5.

The new and improved electric pressure pot, in accordance with that form of the invention illustrated in Figs. 1 to 4 inclusive, includes a pot body 10 having hollow walls. Heating coils 11 are mounted within said walls. Heat insulating material 12, such as fiber glass, is mounted within the walls of the pot to keep the outside cool. The pot is provided with a removable cover 13. This cover has a threaded section 14 which threadedly engages a section 15 of the pot body 10 by which the cover may be tightly mounted on and over the pot body 10 so that a pressure may be built up within the pot. A safety valve and pressure gauge 16 is provided for the pot. The heating coil 11 is associated with rheostats 17 and 18 by which the heat in the pot may be controlled.

A multiple confining ring 15$^a$ may be held securely between the threaded sections 14 and 15. This confining ring 15$^a$ is in the form of concentric annular members with inner openings for permitting smaller size cooking pots to be located therein. The confining ring member may be loosely or hingedly attached to each other.

The pot body 10 is shown constructed from an outer metallic section 20 threadedly connected with a bottom metallic section 21. The pot 10 also has a porcelain, or similar interior section 22 which has its inner face covered with a metal section 23. The heat windings 11 are arranged around the porcelain section 22 which is provided with suitable handles 22$^a$. The fiber glass 12 is engaged within the section 20, around the section 22 and against the heating coils 11.

The cover 13 is also constructed of an outer metallic section 25 and interior heat insulation material 26, such as fiber glass. The cover has a handle 27 by which it may be readily moved. The pot body 10 is provided with handles 28.

The rheostat 17 has a moveable contact arm 30 engaging across the coils 31 thereof. The contact arm 30 is connected with an external knob 32 working across a scale 33 on the side of the pot body 10. This scale indicates various articles of food which may be cooked in the pot, and indicates the amount of heat the different foods require. The scale reads: soup, fruits, vegetables, and meats.

The rheostat 18 has a moveable contact arm 35 working across the coil 36. The contact arm 35 is connected with a knob 37 having a pointer working across a scale 38 on the side of the pot 10. This scale indicates high heat, medium heat, and low heat.

Figure 7:
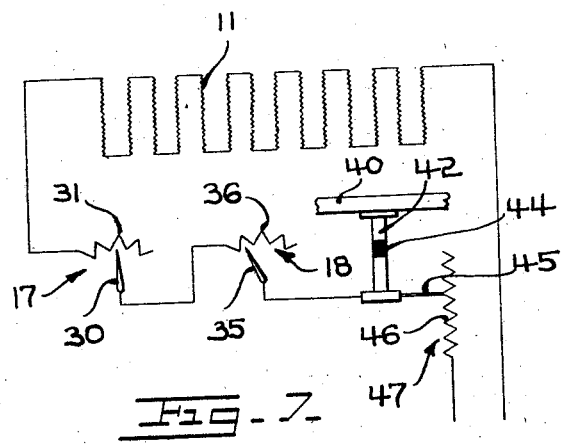
Fig. 7 is a schematic wiring diagram of the pressure pot shown in Figs. 5 and 6.

In Figs. 5 to 7 inclusive, a modified form of the invention has been disclosed which is very similar to the prior form distinguishing merely in the fact that a depressible platform 40 is mounted within the bottom of the pressure pot body and is normally urged into a raised position by an expansion spring 41. The depressible platform 40 is supported on the stud 42 which passes through a packing box 43 in the bottom wall of the pressure pot body 10. The bottom end of the stud 42 rests upon said spring 41. The stud 42 has a central insulation section 44 to prevent short circuiting the electric circuit of the pressure pot. A contact arm 45 is mounted on the bottom portion of the stud 42 and works across a resistance coil 46, and these parts form an additional rheostat 47 by which the heat of the coils 11 is automatically varied. The rheostat 47 is connected in series with the rheostat 17 and 18.

In other respects this form of the invention is identical to the prior form and identical parts may be recognized by the same reference numerals.

The use of the pressure pot is as follows:

The cover must be removed. Then the food in dishes, or without dishes, is placed in the pot. The cover is replaced and the current is turned on to the heating coils. The degree of heat is controlled by the rheostat 17 and 18.

In the second form of the invention there is an additional rheostat 17 which cuts down the heat of the coils 11, the lighter the food within the pot becomes, due to the driven out moisture from the food.

The pot body is provided with a plurality of leg members 10ª to permit free circulation of air completely around the pot body, which is kept comparatively cool at its outer surface, but is rapidly heated at the interior section. The food in this electric pressure pot and automatic cooker is cooked in a very short time, and after the current is turned off it retains the heat for a long period of time.

It is to be understood that the cover 13 may be secured to the pot 10 in any desired manner.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A pressure cooking pot comprising a body having inner and outer spaced walls, a bottom having a receptacle therein, said inner and outer walls being separated by heat insulating material, a porcelain jacketed inner portion in said body, heating coils surrounding said jacket, a heating circuit including manually controlled rheostats, a resistance in the circuit disposed in said receptacle, a bottom plate in the inner jacketed portion of the body, means of yieldably resisting a downward movement of the plate including a stud having an arm thereon for wiping contact with said resistance and a spring whereby the heat of the coils may be decreased automatically by said resistance upon upward movement of the plate under the influence of said spring when the material supported on said plate decreases in weight, a cover threaded to said body and a safety valve in said cover.

IRVING PAGE.

REFERENCES CITED

The following references are of record in the file of this patent:

UNITED STATES PATENTS

| Number | Name | Date |
| --- | --- | --- |
| 799,377 | Harden | Sept. 12, 1905 |
| 1,526,369 | Pollard | Feb. 17, 1925 |
| 1,675,091 | Campbell | June 26, 1928 |
| 1,931,190 | Goughnour | Oct. 17, 1935 |
| 1,946,220 | Lotz | Feb. 6, 1934 |
| 1,994,629 | Arkema | Mar. 19, 1935 |
| 2,194,118 | Graham | Mar. 19, 1940 |